United States Patent
Zhao et al.

(10) Patent No.: US 10,982,137 B1
(45) Date of Patent: Apr. 20, 2021

(54) FLUORESCENT DISPERSED PARTICLE GEL, FLUORESCENT GEL AND FLUORESCENT MODIFIED POLYACRYLAMIDE COMPOSITE AND PREPARATION METHOD AND USE THEREOF

(71) Applicants: China University of Petroleum (East China), Qingdao (CN); The Research Institute of Petroleum Exploration and Development (RIPED) of the Petro China Company, Beijing (CN); China University of Geosciences (Beijing), Beijing (CN)

(72) Inventors: Guang Zhao, Qingdao (CN); Caili Dai, Qingdao (CN); Xu Jin, Qingdao (CN); Ning Yang, Qingdao (CN); Qing You, Beijing (CN); Mingwei Zhao, Qingdao (CN)

(73) Assignees: China University of Petroleum (East China), Qingdao (CN); The Research Institute of Petroleum Exploration and Development (RIPED) of the Petro China Company Limited (Petro China), Beijing (CN); China University of Geosciences (Beijing), Beijing (CN)

( * ) Notice: Subject to any disclaimer, the term of this patent is extended or adjusted under 35 U.S.C. 154(b) by 0 days.

(21) Appl. No.: 16/899,827

(22) Filed: Jun. 12, 2020

(30) Foreign Application Priority Data

Apr. 3, 2020 (CN) .......................... 202010260159.2

(51) Int. Cl.
*C08F 220/56* (2006.01)
*C09K 11/06* (2006.01)
*C08J 3/075* (2006.01)

(52) U.S. Cl.
CPC ............ *C09K 11/06* (2013.01); *C08F 220/56* (2013.01); *C08J 3/075* (2013.01); *C08F 2800/20* (2013.01); *C08F 2810/20* (2013.01); *C09K 2211/145* (2013.01)

(58) Field of Classification Search
CPC .............................. C08F 220/56; C09K 11/06
See application file for complete search history.

(56) References Cited

FOREIGN PATENT DOCUMENTS

| CN | 102936490 A | 2/2013 |
| CN | 102996106 B | 3/2013 |
| CN | 107245334 A | * 10/2017 |

OTHER PUBLICATIONS

Machine-generated English-language translation of CN-107245334-A.*
Yan et al., Chem. Res. Appl. 2012, 24(6): 996-1001 (English-language abstract).*
Yan, L. et al. "A Water-Soluble Oil-Displacing Agent with Tracer Properties for Enhancing Oil Recovery" (2015) RSC Adv. 5: 42843-42847.

(Continued)

*Primary Examiner* — Vu A Nguyen
(74) *Attorney, Agent, or Firm* — Volpe Koenig

(57) ABSTRACT

The present disclosure discloses a fluorescent dispersed particle gel, a fluorescent gel, a fluorescent modified polyacrylamide composite, and a preparation method and use thereof.

8 Claims, 3 Drawing Sheets

(56) References Cited

OTHER PUBLICATIONS

Yang, H. et al. "Preparation of a Fluorescent Polymer Microsphere and Stability Evaluation of its Profile Control System by a Fluorescence Stability Index" (2018) Colloids and Surfaces A 558: 512-519.

Wang, B. et al. "Synthesis and Photophysical Behavior of a Water-Soluble Fluorescein-Bearing Polymer for Fe3+ Ion Sensing" (2008) J Polym Res 15: 427-433.

* cited by examiner

FLUORESCENT DISPERSED PARTICLE GEL, FLUORESCENT GEL AND FLUORESCENT MODIFIED POLYACRYLAMIDE COMPOSITE AND PREPARATION METHOD AND USE THEREOF

PRIORITY CLAIM & CROSS REFERENCE

The Application claims priority to the Chinese Application No. 202010260159.2, filed on Apr. 3, 2020, entitled "Fluorescent Dispersed Particle Gel, Fluorescent Gel and Fluorescent Modified Polyacrylamide Composite and Preparation Method and Use Thereof", which is herein specifically and entirely incorporated by reference.

FIELD

The present disclosure relates to the technical field of oil field chemistry, in particular to a fluorescent dispersed particle gel, a fluorescent gel and a fluorescent modified polyacrylamide composite and a preparation method and use thereof.

BACKGROUND

The water injection development has emerged as the primary mode of oil field exploitation in China, because of the fact that reservoir suffers from serious heterogeneity, the long-term water injection development causes growth of dominant channels, the oil fields have sequentially entered a stage of high water-cut, such that the oil recovery efficiency is low, the exploitation benefits are poor, about 2/3 residual oil remains underground and is difficult to extract, the exploitation of the complex and water-drive oil reservoirs such as low-permeability cracks, high temperature and high salinity is especially austere.

It is urgent to efficiently regulate and control the dominant channels to improve the recovery rate of the water-drive development oil fields.

The dispersed particle gel drive control (profile control) technology is a newly developed chemical technology for water control, and the adopted dispersed particle gel takes partially hydrolyzed polyacrylamide functional polymer as a main material, and utilizes a certain crosslinking technology and dispersed technology to form bulk gel on the ground, and the bulk gel is subjected to mechanical shearing and physical rounding to prepare the uniformly dispersed aqueous phase solutions with different particle size distributions. The system has wide particle size distribution (nanometer level), low viscosity, high shear resistance, desirable coalescence-expansion capacity (may be 30 times or more), resistance to a high temperature of 130° C., resistance to salt content of 300,000 mg/L, environmental friendliness and low cost with simple conditions and efficient process for the preparation, and exhibits the characteristics of on-line production and injection.

The dispersed particle gel can perform regulation and control of the dominant seepage channel through direct plugging with single particle, bridging with a plurality of particles, or coalescence and expansion by using the plurality of particles. But the dispersed particle gel injected for a long time is inevitably produced due to the serious influence of the development of the reservoir seepage dominant channels. According to the change characteristics of the underground seepage field and the pressure field of the water injection well group, the injected dispersed particle gel is preferentially produced from the dominant seepage channel which is seriously developed. By analyzing the time of visible fluorescent tracer agent and the concentration of visible fluorescent tracer agent in regard to the concentration of the dispersed particle gel of the produced liquid of the oil well corresponding to the water injection well group, the development condition of the dominant channel of the oil well corresponding to the water injection well group can be judged, thereby provide a basis for the adjustment of the subsequent process of injecting the dispersed particle gel. Given that the injected dispersed particle gel is uniformly dispersed in an aqueous solution and the concentration of produced liquid is low, the production condition of the dispersed particle gel cannot be visually observed. The concentration of the dispersed particle gel can be measured with the starch-cadmium iodide method by reacting bromine with the polymer amide group in the first step reaction of the Hofmann rearrangement to form the N-bromoamide, the compound is hydrolyzed to produce hypobromous acid, which quantitatively oxidizes iodide ions to produce iodine. However, the method requires high quality of the produced liquid, and an effective measurement can only performed when the concentration of the dispersed particle gel in the produced liquid is generally more than or equal to 20 mg/L, thus it is difficult to monitor the development condition of the dominant seepage channel of the water injection well group according to the dispersed particle gel in the produced liquid.

CN102936490A discloses a preparation method of an environment-friendly multi-scale zirconium dispersed particle gel plugging agent. The method is performed according the following steps: (1) adding a zirconium acetate cross-linking agent solution into the non-ionic polyacrylamide solution to obtain a zirconium gelling solution, wherein the mass fraction of the non-ionic polyacrylamide in the gelling solution is 0.6-1.0%, the mass fraction of the zirconium acetate cross-linking agent is 1.0-2.0%, uniformly stirring, and standing still at 30° C. for gelling to obtain the zirconium bulk gel; (2) taking a colloid mill as shearing equipment, adjusting the rotating speed of the colloid mill to be within a range of 100-3,000 rpm, and controlling the shearing distance to be within a range of 10-170 μm, wherein the bulk gel prepared in the step (1) and water are mixed according to the mass ratio of 1-6:1 and the mixture is added into a colloid mill; (3) starting a colloid mill, circularly shearing the zirconium gel for 3-15 min, and uniformly dispersing it to obtain the product.

CN102996106B discloses an online continuous production and injection integrating method and device for dispersed particle gel. The method comprises the following steps: curing a polymer and preparing a bulk gel system; then pumping the prepared gel system into a colloid mill through a flowmeter to prepare a dispersed particle gel; introducing the prepared dispersed particle gel into a buffer tank, and pumping the dispersed particle gel in the buffer tank into a water injection well through a high-pressure plunger pump.

However, the two methods mentioned above mainly relate to a preparation method of the dispersed particle gel, and the dispersed particle gel of the produced liquid in the dominant seepage channel of the water injection well group cannot be effectively analyzed.

Therefore, the research on methods for analyzing the dominant seepage pathway is of great significance.

SUMMARY

The present disclosure aims to overcome the defect in the prior art that cannot effectively analyze the produced liquid dispersed particle gel in the dominant seepage channel of a water injection well group, and provides a fluorescent dispersed particle gel, a fluorescent gel and a fluorescent modified polyacrylamide composite as well as a preparation method and application thereof.

In order to fulfill the above purpose, a first aspect of the present disclosure provides a fluorescence modified polyacrylamide composite, wherein the composite has a structural unit represented by Formula (1) and a structural unit represented by Formula (2);

The second aspect of the present disclosure provides a preparation method of the aforementioned fluorescence modified polyacrylamide composite, wherein the method comprises: subjecting a monomer shown in a Formula (3) and poly-acrylamide to polymerization reaction in a redox initiation system and in the presence of deionized water and a cosolvent, so as to obtain a fluorescence modified polyacrylamide composite;

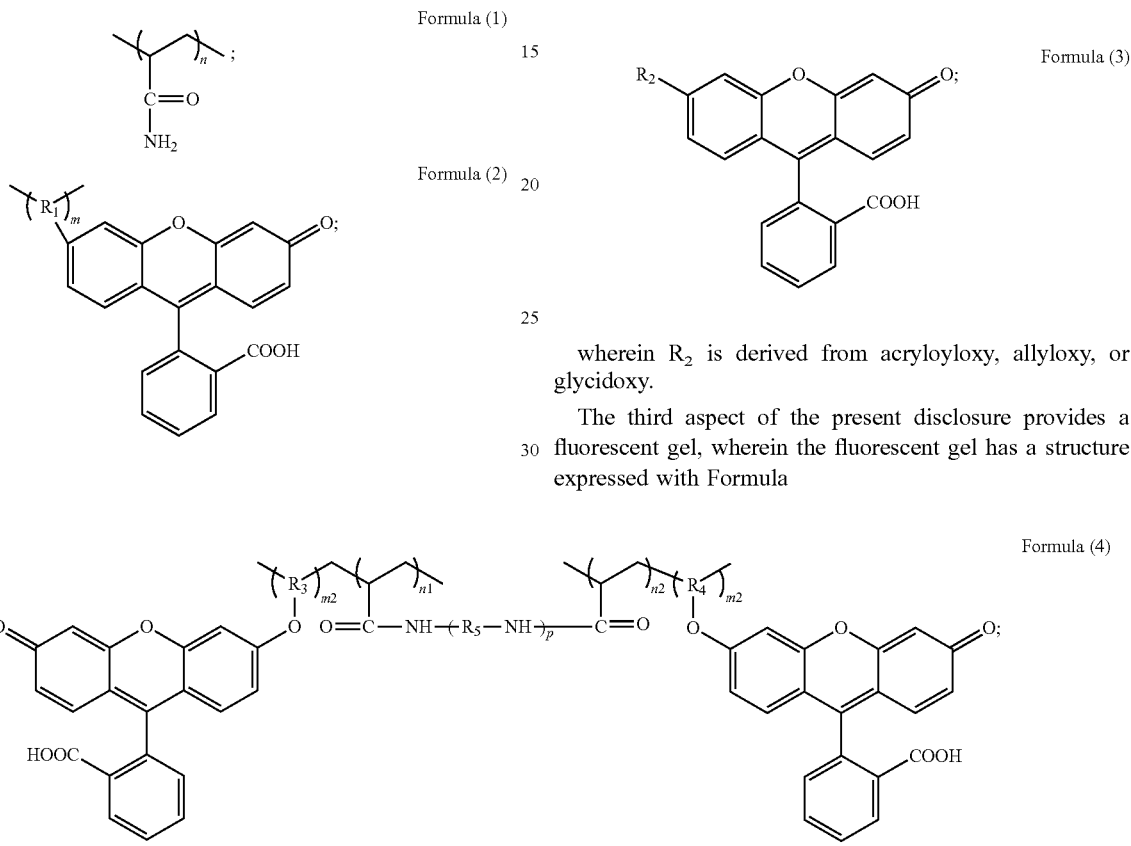

wherein $R_2$ is derived from acryloyloxy, allyloxy, or glycidoxy.

The third aspect of the present disclosure provides a fluorescent gel, wherein the fluorescent gel has a structure expressed with Formula

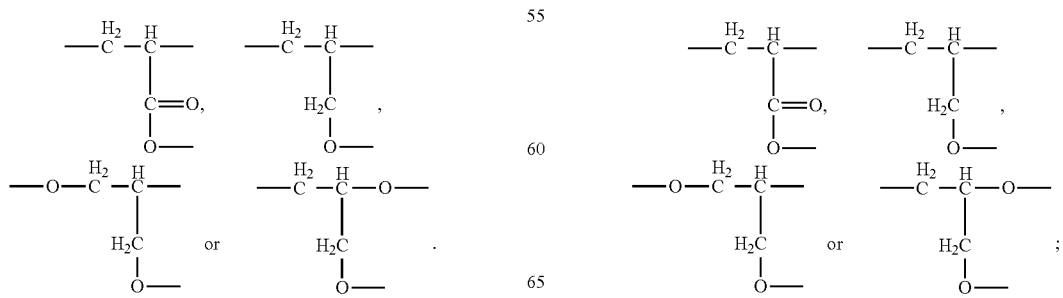

wherein m is an integer within a range of 6-60, n is an integer of within a range of 2,800-28,000;

$R_1$ is derived from wherein $m_1$ and $m_2$ are the same or different, and each is an integer within a range of 6 to 60; $n_1$ and $n_2$ are the same or different, and each is an integer within a range of 2,800-28,000; p is an integer within a range of 1,200-1,600;

wherein $R_3$ and $R_4$ are the same or different, each is derived from wherein $R_5$ is derived from ethylidene or propylidene.

The fourth aspect of the present disclosure provides a preparation method of the aforementioned fluorescent gel, wherein the method comprises:

(1) dissolving the fluorescence modified polyacrylamide composite in solution preparation water to obtain a composite solution;

(2) mixing the composite solution with an imine cross-linking agent to obtain a gelling solution;

(3) standing still and aging the gelling solution to obtain the fluorescent gel;

wherein the fluorescent modified polyacrylamide composite is the aforementioned fluorescent modified polyacrylamide composite.

The fifth aspect of the present disclosure provides a fluorescent dispersed particle gel, wherein the fluorescent dispersed particle gel is obtained by shearing the fluorescent gel and water; wherein the fluorescent gel is the aforementioned fluorescent gel.

The sixth aspect of the present disclosure provides an application of a fluorescent dispersed particle gel for identifying a dominant seepage channel, wherein the fluorescent dispersed particle gel is the aforementioned fluorescent dispersed particle gel.

Due to the aforementioned technical solutions, the present disclosure has the following advantages as compared with the prior art:

(1) the fluorescent dispersed particle gel disclosed by the present disclosure has the advantages of stable fluorescence property, easiness in detection operation, low floor level of detection concentration (the floor level of critical detection concentration is 5 mg/L), not easily affected by produced liquid crude oil or other produced substances, and being suitable for rapid detection of the dominant seepage channel of a water injection well group under the conditions that the temperature is ≤80° C. and the mineralization degree is ≤10 mg/L of an oil reservoir.

(2) The present disclosure adopts an in-situ polymerization method to prepare the fluorescence modified polyacrylamide composite, uses a redox initiation system initiated at low temperature to graft and polymerize the fluorescent group which is easy to be detected, the reaction is safe, energy-saving and environmentally friendly and does not need a high-temperature operation, and the reaction process is stable.

(3) The components in the fluorescent gel have good compatibility, the preparation process of the gelling solution is simple, the gelling solution can be prepared with clean water or high mineralization degree oilfield reinjection waste water, thereby alleviating the difficult problem resulting from shortage of fresh water resources in the complex and harsh construction processes in mudflat, desert and the like.

(4) The present disclosure adopts the cross-linking technology and the shearing technology to prepare the fluorescent gel into the fluorescent dispersed particle gel, the operation is convenient and simple, and the fluorescent dispersed particle gel is environmentally friendly with excellent stability; and the fluorescent dispersed particle gel has wide source of raw materials and can be prepared with simple process.

Figure 1:
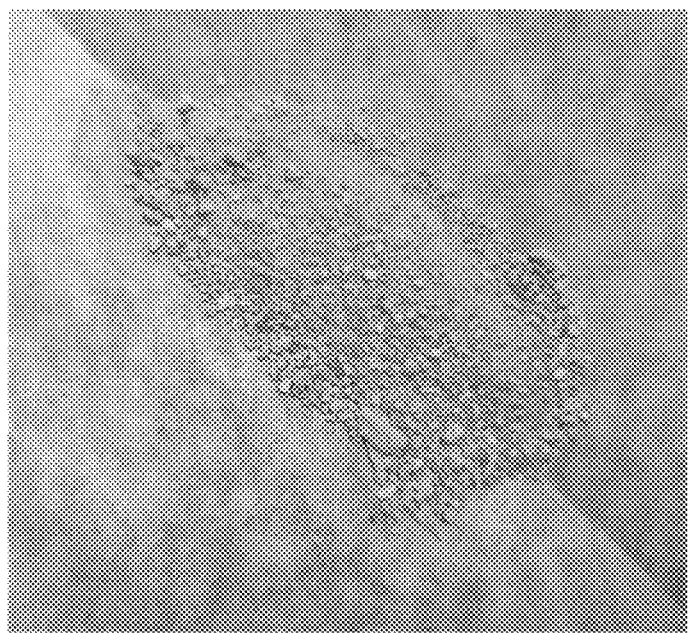
FIG. 1 is a macro topography photo of a fluorescence modified polyacrylamide composite prepared by Example 1 of the present disclosure.

DESCRIPTION OF THE REFERENCE SIGNS $A_1$ refers to No. $A_1$ rock core in a double-tube rock core parallel physical experiment model;

$A_2$ refers to No. $A_2$ rock core in a double-tube rock core parallel physical experiment model;

$B_1$ refers to No. $B_1$ rock core in a four-tube rock core parallel physical experiment model;

$B_2$ refers to No. $B_2$ rock core in a four-tube rock core parallel physical experiment model;

$B_3$ refers to No. $B_3$ rock core in a four-tube rock core parallel physical experiment model;

$B_4$ refers to No. $B_4$ rock core in a four-tube rock core parallel physical experiment model;

1. acryloxylfluorescein (Ex);
2. fluorescent modified polyacrylamide composite (Ex);
3. fluorescent dispersed particle gel (Ex);
4. acryloxylfluorescein (Em);
5. fluorescent modified polyacrylamide composite (Em);
6. fluorescent dispersed particle gel (Em).

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

The first aspect of the present disclosure provides a fluorescence modified polyacrylamide composite, wherein the composite has a structural unit represented by Formula (1) and a structural unit represented by Formula (2);

Formula (1)

7
-continued

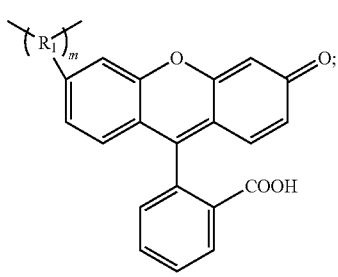

Formula (2)

wherein in is an integer within a range of 6-60, n is an integer of within a range of 2,800-28.000;

$R_1$ is derived from

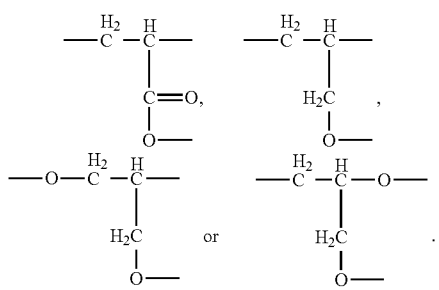

According to the present disclosure, it is preferably that m is an integer within a range of 16-30, n is an integer within a range of 7,000-14,000; more preferably, m is an integer within a range of 20-26 and n is an integer within a range of 8,750-12,500.

According to the present disclosure, $R_1$ is derived from

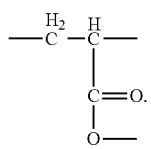

According to the present disclosure, the fluorescence modified polyacrylamide composite has a weight average molecular weight within a range of $20 \times 10^4$ to $200 \times 10^4$ (200,000-2,000,000), more preferably $50 \times 10^4$ to $100 \times 10^4$ (500,000-1,000,000); the degree of hydrolysis is 10-20%, preferably 15-19%.

According to the present disclosure, a molar ratio of the amount of structural unit represented by Formula (2) to structural unit represented by Formula (1) is (6-60): (2,800-28,000), preferably (16-30): (7,000-14,000), more preferably (20-26): (8,750-12,500).

The second aspect of the present disclosure provides a preparation method of the aforementioned fluorescence modified polyacrylamide composite, wherein the method comprises: subjecting a monomer shown in a Formula (3) and poly-acrylamide to polymerization reaction in a redox initiation system and in the presence of deionized water and a cosolvent, so as to prepare a fluorescence modified poly-acrylamide composite expressed in Formula (1);

8

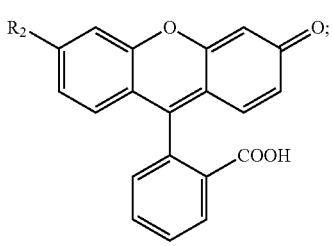

Formula (3)

wherein $R_2$ is derived fro acryloyloxy, allyloxy or glycidoxy.

According to the present disclosure, the monomer expressed by Formula (3) is fluorescein which can be obtained by self-made process in laboratories, for example, taking the acryloxylfluorescein as an example, the specific preparation method comprises the following steps:

3 g fluorescein and 5 mL triethylamine were dissolved in 20 mL dichloromethane, the solution was placed in a flask, the flask was disposed in an ice-water bath, and subjected to continuous stirring. 1 g acryloyl chloride was dissolved in 20 mL of methylene chloride, the solution was slowly dropped into the flask within 30 minutes. The ice-water bath was removed and the reaction was performed at 25° C. for 24 hours. The dichloromethane was removed from the reaction product by rotary evaporation to obtain an orange-yellow mixture, a large amount of deionized water was added to separate the precipitate, which was subjected to filtering and drying, and recrystallizing with ethanol for twice, an orange-yellow solid was prepared after drying, it was exactly the acryloyloxy fluorescein.

According to the present disclosure, $R_2$ is derived from preferably acryloxyl.

According to the present disclosure, a molar ratio of the used amount of a monomer represented by Formula (3) relative to poly-acrylamide is (6-60): (2,800-28,000), preferably (16-30): (7,000-14,000), more preferably (20-26): (8,750-12,500).

According to the present disclosure, the redox initiation system comprises a reducing agent and an oxidizing agent, wherein the reducing agent is one or more selected from the group consisting of sodium bisulfite, sodium sulfite, alcohols, monovalent copper ions and divalent iron ions; the oxidant is one or more selected from the group consisting of ammonium persulfate, potassium persulfate, hydrogen peroxide and sodium persulfate.

In the present disclosure, both the reducing agent and the oxidizing agent are commercially available, for Example, purchased from the Sinopharm Group Chemical Reagent Co., Ltd. in China According to the present disclosure, the cosolvent is one or more selected from the group consisting of sodium dodecyl sulfonate, sodium dodecyl sulfate, sodium dodecyl benzene sulfonate and sodium dodecyl polyoxyethylene sulfate; preferably, the co-solvent is selected from sodium dodecyl sulphate and/or sodium dodecyl sulphate.

In the present disclosure, the cosolvent is commercially available, for Example, purchased from Tianjin Chemical Reagent Co., Ltd. in China.

According to the present disclosure, the cosolvent is 2-8 parts by weight, the reducing agent is 0.06-0.24 part by weight, the oxidizing agent is 0.06-0.24 part by weight, a monomer represented by Formula (3) is 0.1-0.4 part by weight, and poly-acrylamide is 10-25 parts by weight, relative to 100 parts by weight of deionized water; preferably, the cosolvent is 3-5 parts by weight, the reducing agent is 0.08-0.14 part by weight; the oxidizing agent is 0.08-0.14 part by weight, a monomer represented by Formula (3) is 0.15-0.3 part by weight, and poly-acrylamide is 18-24 parts by weight, relative to 100 parts by weight of deionized water.

According to the present disclosure, the conditions of polymerization reaction comprise: the temperature is 25-50° C., and the time is 1-6 h; preferably, the temperature is 35-45° C. and the time is 2-4 h. In the present disclosure, the monomer expressed by formula (3) and poly-acrylamide are subjected to polymerization reaction by using an aqueous solution polymerization process, the process has the advantages that the heat generated from polymerization is easy to diffuse, the polymerization reaction temperature can be easily controlled, a finished product can be directly obtained in a solution mode; as compared with an organic solvent, the aqueous solution polymerization process uses water as a solvent, it has the advantages of being non-toxic and easily available with low cost.

According to the present disclosure, the polymerization reaction is preferably carried out under a stirring condition, wherein the stirring speed is within a range of 200-700 rpm, preferably 400-600 rpm.

According to the present disclosure, the polymerization reaction is preferably carried out under the protection of nitrogen, wherein the flow rate of nitrogen is 2-12 mL/min, preferably 4-8 mL/min.

According to the present disclosure, the preparation method of the fluorescence modified polyacrylamide composite further comprises the following steps: washing and drying a product produced after the polymerization reaction to obtain a gel block; and subjecting the gel block to crushing and screening process. In the present disclosure, a product obtained after the polymerization reaction is washed with a washing solution, wherein the washing solution comprises water and ethanol; the drying process is not particularly defined, for example, the drying process may be performed in a backing oven at 30-45° C. In addition, in the present disclosure, the gel block is crushed by a crusher and sieved by a vibrating screen with 30-300 meshes.

According to a preferred embodiment of the present disclosure, the preparation method of the fluorescence modified polyacrylamide composite comprises:

Initially adding a cosolvent into deionized water at room temperature (25-50° C.), and stirring for 10 min at a stirring speed of 400 rpm to obtain a uniformly dispersed solution; adding a monomer (fluorescein) expressed by formula (3) while stirring, and continuously stirring for 20 min; secondly, adding an poly-acrylamide monomer during the stirring process, continuously introducing nitrogen for 60 min, stirring for 50 min, and controlling the reaction temperature to be 42° C.; adding sodium bisulfate and stirring for 10 min, subsequently adding ammonium persulfate, mixing uniformly and carrying out reaction for 4 h; after the reaction is finished, washing the product with the washing liquid for three times, drying the product in a backing oven at a temperature of 40° C., taking out the gel block, crushing and sieving the gel block to obtain the fluorescence modified polyacrylamide composite with yellow color.

The third aspect of the present disclosure provides a fluorescent gel, wherein the fluorescent gel has a structure represented by Formula (4);

Formula (4)

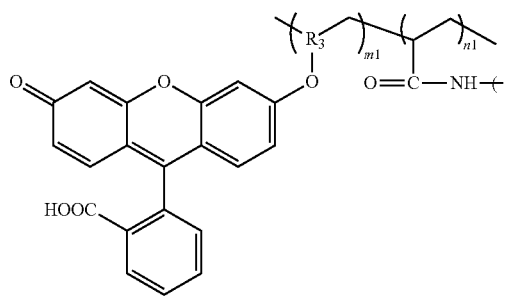
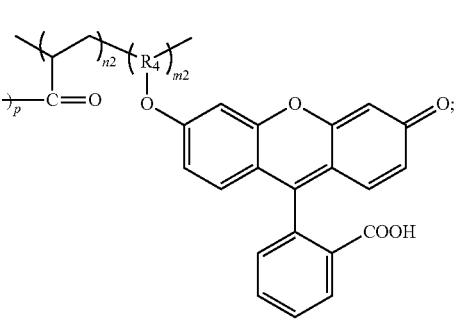

wherein $m_1$ and $m_2$ are the same or different, and each is an integer within a range of 6-60; $n_1$ and $n_2$ are the same or different, and each is an integer within a range of 2,800-28,000; p is an integer within a range of 1,200-1,600; $R_3$ and $R_4$ are the same or different, each is derived from

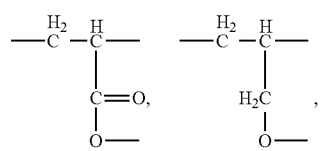

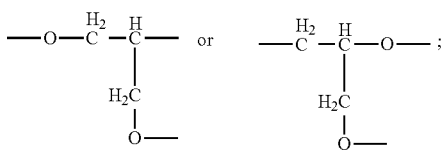

According to the present disclosure, it is preferably that $m_1$ and $m_2$ are the same, and each is an integer within a range of 16-30; $n_1$ and $n_2$ are the same, and each is an integer within a range of 7,000-14,000; p is an integer within a range of 1,400-1,500; more preferably, $m_1$ and $m_2$ are the same, and each is an integer within a range of 20-26; $n_1$ and $n_2$ are the same, and each is an integer within a range of 8,750-12,500.

According to the present disclosure, preferably $R_3$ and $R_4$ are the same or different, each is derived from

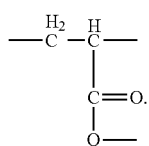

According to the present disclosure, $R_5$ is preferably derived from ethylidene.

The fourth aspect of the present disclosure provides a preparation method of the aforementioned fluorescent gel, wherein the method comprises:

(1) dissolving the fluorescence modified polyacrylamide composite in solution preparation water to obtain a composite solution;

(2) mixing the composite solution with an imine cross-linking agent to obtain a gelling solution;

(3) standing still and aging the gelling solution to obtain the fluorescent gel;

wherein the fluorescent modified polyacrylamide composite is the aforementioned fluorescent modified polyacrylamide composite.

According to the present disclosure, the solution preparation water used in the solution preparation may be clean water or high mineralization degree oilfield reinjection waste water, thereby alleviating the difficult problem resulting from shortage of fresh water resources in the complex and harsh construction processes in mudflat, desert and the like.

According to the present disclosure, the mineralization degree of the solution preparation water is $0-10\times10^4$ (0-100,000) mg/L, preferably $1\times10^4$ mg/L, wherein the content of sodium ions is 0-8,000 mg/L: the content of calcium ion is 0-1,000 mg/L, and the content of magnesium ion is 0-1,000 mg/L.

According to the present disclosure, the imine cross-linking agent is polyethyleneimine and/or polypropyleneimine. In the present disclosure, the imine crosslinking agent is selected, and the method has the advantages of low toxicity, environmental friendliness, rapid cross-linking at low-temperature and imposing no influence on the fluorescence property detection of the fluorescent group. If an imine crosslinking agent is not used, the inorganic/organic chromium crosslinking agent can form gel at low temperature, but the environmental protection performance is poor; the resin crosslinking agent can perform cross-linking rapidly at high temperature (the gelling time is less than or equal to 12 hours, and the temperature is more than or equal to 105° C.), but the structure of the fluorescent group is destroyed at high temperature, so that the fluorescence property of the fluorescent group is significantly degraded, and the detection is difficult.

According to the present disclosure, relative to 100 parts by weight of the solution preparation water, the fluorescence modified polyacrylamide composite is 0.3-1.6 parts by weight, preferably 1-1.6 parts by weight, more preferably 1.02-1.54 parts by weight; the imine cross-linking agent is 0.5-1.5 parts by weight, preferably 0.7-1.1 parts by weight, more preferably 0.76-1.03 parts by weight.

According to the present disclosure, the conditions of standing still comprise: the temperature is 40-100° C. and the time is 20-80 h; preferably, the temperature is 50-60° C. and the time is 36-64 h.

According to a preferred embodiment of the present disclosure, the preparation method of the fluorescent gel comprises:

adding the fluorescence modified polyacrylamide composite into the solution preparation water at the room temperature (20±5° C.), stirring for 60 min at a stirring speed of 200 rpm until the fluorescence modified polyacrylamide composite is dissolved, so as to obtain a fluorescence modified polyacrylamide composite solution; adding an imine cross-linking agent under the conditions of a stirring speed of 200 rpm and a stirring time of 30 min to produce a gelling solution, and forming a gel at 60° C. to prepare the fluorescent gel.

The fifth aspect of the present disclosure provides a fluorescent dispersed particle gel, wherein the fluorescent dispersed particle gel is obtained by shearing the fluorescent gel and water; wherein the fluorescent gel is the aforementioned fluorescent gel.

According to the present disclosure, the weight ratio of the used amount of the fluorescent gel to the water is (2-20): 1, preferably (9-10): 1, more preferably 9:1; the used amount of water in the formed dispersed particle gel is within a range defined by the present disclosure, the formed dispersed particle gel has stable fluorescence property, and the detection can be easily operated.

According to the present disclosure, the water is liquid preparation water, for Example, it can be simulated water comprising NaCl with a concentration of 8,000 mg/L, $CaCl_2$ with a concentration of 1,000 mg/L and $MgCl_2$ with a concentration of 1,000 mg/L.

According to the present disclosure, the shearing process is carried out in a colloid mill, wherein the rotating speed is 6,000-12,000 rpm, and the shearing time is 3-15 min; preferably, the rotation speed is 8,000-10,000 rpm, and the shearing time is 6-12 min.

According to the present disclosure, the fluorescent dispersed particle gel has a particle size of 200-600 nm.

The sixth aspect of the present disclosure provides an application of a fluorescent dispersed particle gel for identifying a dominant seepage channel, wherein the fluorescent dispersed particle gel is the aforementioned fluorescent dispersed particle gel.

The present disclosure will be described in detail below with reference to examples.

In the following Examples and Comparative Examples:

(1) the particle size of the fluorescent dispersed particle gel was measured by a dynamic light scattering analyzer with a model Nano Brook Omni purchased from Bruker Corporation in Germany; the fluorescence excitation spectrum and the fluorescence emission spectrum were measured by a fluorescence spectrometer with a model FS5 purchased from Edinburgh Instruments Ltd in the United Kingdom; the absorbance of the fluorescent dispersed particle gel in the produced liquid was measured by an ultraviolet-visible spectrophotometer with a model UV5 purchased from the Mettler Toledo in switzerland.

(2) The raw materials of poly-acrylamide, sodium bisulfite, ammonium persulfate, sodium dodecyl sulfate and imine cross-linking agent are commercially available products with the analytical purity grade.

(3) The method for identifying the dominant seepage channel comprises the following steps: connecting the rock cores with different permeability grade differences in parallel, performing water flooding to obtain 2 times of pore volume, then injecting pores with the fluorescence dispersed particle gel, analyzing the spectrum of the fluorescence dispersed particle gel in the produced liquid, and determining that the rock core in which the fluorescence dispersed particle gel is first detected is the dominant seepage channel development.

Example 1

This Example serves to illustrate a fluorescent dispersed particle gel prepared with a process of the present disclosure.

(1) Preparation of the Fluorescence Modified Polyacrylamide Composite 0.8 g of sodium dodecyl sulfate cosolvent was initially added into 20 g of deionized water at room temperature (25° C.), the mixture was stirred for 10 min under a condition comprising a stirring speed of 400 rpm to obtain a uniformly dispersed solution; 0.05 g of acryloxyl fluorescein (a monomer expressed by Formula (3), wherein $R_2$ is derived from acryloxyl) was added while stirring, and the mixture was continuously stirred for 20 min; secondly, 4 g of polyacrylamide monomer was added while stirring, nitrogen was continuously introduced for 60 min while stirring for 50 min, the reaction temperature was controlled to be 42° C.; 0.02 g of sodium bisulfate was added and stirred for 10 min, 0.02 g of ammonium persulfate was further added and uniformly mixed, then subjected to a reaction for 3 h; after the reaction was finished, the product was washed with the washing liquid for three times, the product was dried in a backing oven at a temperature of 40° C., the gel block was taken out and subjected to crushing and sieving, thereby preparing the fluorescence modified polyacrylamide composite with yellow color.

As a result, a fluorescence modified polyacrylamide composite having a weight-average molecular weight of $70\times10^4$ and a hydrolysis degree of 16.4% was prepared, and the fluorescent modified polyacrylamide composite comprises a structural unit represented by Formula (1) and a structural unit represented by Formula (2), wherein $R_1$ was derived from

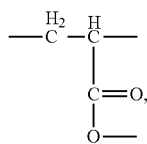

m was 24, and n was 10,500. A molar ratio of the amount of structural unit represented by Formula (2) to structural unit represented by Formula (1) is 24:10,500.

In addition, FIG. 1 is a macro topography photo of a fluorescence modified polyacrylamide composite prepared by Example 1 of the present disclosure, that is, the powder obtained by drying and grinding the fluorescence modified polyacrylamide composite prepared in Example 1, the powder has good solubility in water, and is convenient for subsequent application on the site.

(2) Preparation of the Fluorescent Gel

The process comprises the following steps: 1 g of the fluorescence modified polyacrylamide composite was initially added into 98.25 g of liquid preparation water (simulated water: comprising 8,000 mg/L NaCl; 1,000 mg/L $CaCl_2$; 1,000 mg/l $MgCl_2$) at room temperature (25° C.), the mixture was stirred for 60 min until the fluorescence modified polyacrylamide composite was dissolved, so as to obtain a fluorescence modified polyacrylamide composite solution; 0.75 g of polyethylenimine crosslinking agent was added while stirring, subjected to further stirring for 10 min to obtain a gelling solution, and then subjected to standing still at 60° C. for 24 h to obtain the fluorescent gel.

(3) Preparation of the Fluorescent Dispersed Particle Gel

The process comprises the following steps: the aforementioned fluorescent gel having a fluorescent group and the solution preparation water (simulated water: comprising 8,000 mg/L NaCl; 1,000 mg/L $CaCl_2$; 1000 mg/L $MgCl_2$) in a mass ratio of 9:1 were added into a colloid mill at room temperature (25° C.), the mixture was subjected to shearing for 12 min at a constant speed in a rotation speed of 10,000 rpm to prepare the fluorescent dispersed particle gel, the average particle size of the fluorescent dispersed particle gel was measured to be 400 nm.

Example 2

This Example serves to illustrate a fluorescent dispersed particle gel prepared with a process of the present disclosure.

A fluorescent dispersed particle gel was prepared according to the same process as in Example 1, wherein the process for preparing a fluorescence modified polyacrylamide composite in step (1) of the Example 2 was same as that of the Example 1, their differences resided in the steps (2) and (3), specifically:

(2) Preparation of the Fluorescent Gel with Fluorescent Group

The process comprises the following steps: 1.2 g of the fluorescence modified polyacrylamide composite was initially added into 97.95 g of liquid preparation water (simulated water: comprising 8,000 mg/L NaCl; 1,000 mg/L $CaCl_2$; 1,000 mg/L $MgCl_2$) at room temperature (25° C.), the mixture was stirred for 60 min until the fluorescence modified polyacrylamide composite was dissolved, so as to obtain a fluorescence modified polyacrylamide composite solution; 0.85 g of polyethyleneimine crosslinking agent was added while stirring, subjected to further stirring for 10 min to obtain a gelling solution, and then subjected to standing still at 60° C. for 20 h to prepare the fluorescent gel.

The process comprises the following steps: adding 1.2 g of the fluorescence modified polyacrylamide composite into 97.95 g of liquid preparation water (simulated water: 8000 mg/L NaCl; 1000 mg/L $CaCl_2$; 1000 mg/L $MgCl_2$) at room temperature (25° C.), and stirring for 60 min until the fluorescence modified polyacrylamide composite is dissolved to obtain a fluorescence modified polyacrylamide composite solution; adding 0.85 g of polyethyleneimine crosslinking agent while stirring, stirring for 10 min to obtain a glue solution, and then standing at 60° C. for 20 h to obtain the fluorescent gel.

(3) Preparation of the Fluorescent Dispersed Particle Gel

The process comprises the following steps: the aforementioned fluorescent gel having a fluorescent group and the solution preparation water (simulated water: comprising 8,000 mg/L NaCl; 1,000 mg/L $CaCl_2$; 1000 mg/L $MgCl_2$) in a mass ratio of 9:1 were added into a colloid mill at room temperature (25° C.), the mixture was subjected to shearing for 12 min at a constant speed in a rotation speed of 8,000 rpm to prepare the fluorescent dispersed particle gel, the average particle size of the fluorescent dispersed particle gel was measured to be 650 nm.

Figure 2:
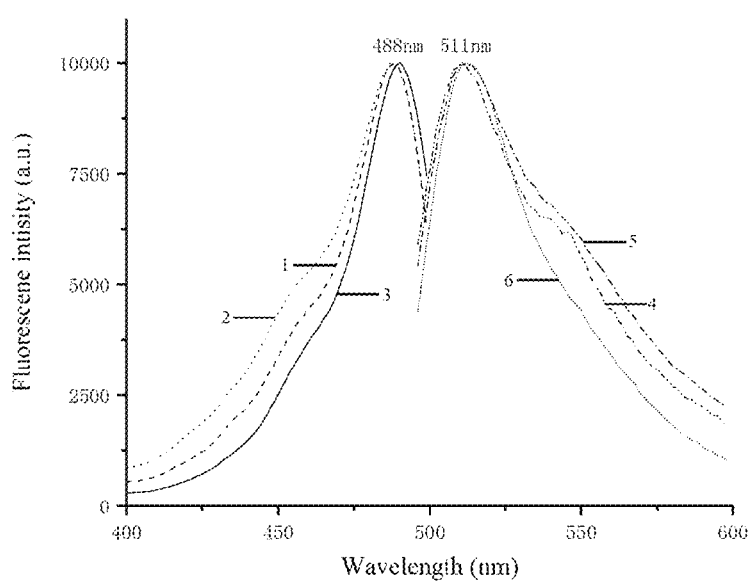
FIG. 2 illustrates a fluorescence excitation spectrum (Ex) and an emission spectrum (Em) of acryloxylfluorescein, the fluorescence modified polyacrylamide composite and the fluorescent dispersed particle gel prepared in Example 2 of the present disclosure.

In addition, FIG. 2 illustrates a fluorescence excitation spectrum (Ex) and an emission spectrum (Em) of acryloxylfluorescein, the fluorescence modified polyacrylamide composite and the fluorescent dispersed particle gel prepared in Example 2 of the present disclosure; as illustrated in FIG. 2, the fluorescence excitation wavelength and the fluorescence emission wavelength of the acryloyloxy fluorescein, the fluorescence modified polyacrylamide composite and the fluorescence dispersed particle gel are substantially identical, which are 488 nm and 511 nm, respectively;

the fluorescence property of a fluorescein group in the fluorescence dispersed particle gel is not influenced, the fluorescence dispersed particle gel with a trace amount can still be detected by a fluorescence spectrometer, the detection limit is low, the fluorescence property is stable, and the fluorescence dispersed particle gel can be used for identifying a dominant seepage channel.

Example 3

This Example serves to illustrate a fluorescent dispersed particle gel prepared with a process of the present disclosure.

A fluorescent dispersed particle gel was prepared according to the same process as in Example 2, wherein the process for preparing a fluorescence modified polyacrylamide composite in step (1) of the Example 3 was same as that of the Example 2, the process for preparing a fluorescent gel having a fluorescent group in step (2) of the Example 3 was same as that of the Example 2, their differences resided in the step (3), specifically:

(3) Preparation of the Fluorescent Dispersed Particle Gel

The process comprises the following steps: the aforementioned fluorescent gel having a fluorescent group and the solution preparation water (simulated water: comprising 8,000 mg/L NaCl; 1,000 mg/L $CaCl_2$; 1000 mg/L $MgCl_2$) in a mass ratio of 10:1 were added into a colloid mill at room temperature (25'C), the mixture was subjected to shearing for 9 min at a constant speed in a rotation speed of 7,000 rpm to prepare the fluorescent dispersed particle gel, the average particle size of the fluorescent dispersed particle gel was measured to be 780 nm.

Example 4

This Example serves to illustrate a fluorescent dispersed particle gel prepared with a process of the present disclosure.

(1) Preparation of the Fluorescence Modified Polyacrylamide Composite 0.8 g of sodium dodecyl sulfate cosolvent was initially added into 20 g of deionized water at room temperature (25° C.), the mixture was stirred for 10 min under a condition comprising a stirring speed of 400 rpm to obtain a uniformly dispersed solution; 0.06 g of acryloxyl fluorescein (a monomer expressed by Formula (3), wherein $R_2$ is derived from acryloxyl) was added while stirring, and the mixture was continuously stirred for 20 min; secondly, 6 g of polyacrylamide monomer was added while stirring, nitrogen was continuously introduced for 60 min while stirring for 50 min, the reaction temperature was controlled to be 42° C.; 0.04 g of sodium bisulfate was added and stirred for 10 min, 0.04 g of ammonium persulfate was further added and uniformly mixed, then subjected to a reaction for 3 h; after the reaction was finished, the product was washed with the washing liquid for three times, the product was dried in a backing oven at a temperature of 40° C., the gel block was taken out and subjected to crushing and sieving, thereby preparing the fluorescence modified polyacrylamide composite with yellow color. As a result, a fluorescent modified polyacrylamide composite having a weight-average molecular weight of $10\times10^4$ (1,000,000) and a hydrolysis degree of 18.1% was prepared, and the fluorescent modified polyacrylamide composite comprises a structural unit represented by Formula (1) and a structural unit represented by Formula (2), wherein $R_1$ was acryloxyl, m was 30, and n was 14,000. A molar ratio of the amount of structural unit represented by Formula (2) to structural unit represented by Formula (1) is 30:14,000.

(2) Preparation of the Fluorescent Gel

The process comprises the following steps: 1.2 g of the fluorescence modified polyacrylamide composite was initially added into 97.8 g of liquid preparation water (simulated water: comprising 8,000 mg/L NaCl; 1,000 mg/L $CaCl_2$; 1,000 mg/L $MgCl_2$) at room temperature (25° C.), the mixture was stirred for 60 min until the fluorescence modified polyacrylamide composite was dissolved, so as to obtain a fluorescence modified polyacrylamide composite solution; 1.0 g of polyethyleneimine crosslinking agent was added while stirring, the mixture was subjected to further stirring for 10 min to obtain a gelling solution, and then subjected to standing still at 60° C. for 18 h to obtain the fluorescent gel.

(3) Preparation of the Fluorescent Dispersed Particle Gel

The process comprises the following steps: the aforementioned fluorescent gel having a fluorescent group and the solution preparation water (simulated water: comprising 8,000 mg/L NaCl; 1,000 mg/L $CaCl_2$; 1000 mg/L $MgCl_2$) in a mass ratio of 9:1 were added into a colloid mill at room temperature (25° C.), the mixture was subjected to shearing for 12 min at a constant speed in a rotation speed of 8,000 rpm to prepare the fluorescent dispersed particle gel, the average particle size of the fluorescent dispersed particle gel was measured to be 680 nm.

Example 5

This Example serves to illustrate a fluorescent dispersed particle gel prepared with a process of the present disclosure.

A fluorescent dispersed particle gel was prepared according to the same process as in Example 4, wherein the process for preparing a fluorescence modified polyacrylamide composite in step (1) of the Example 5 was same as that of the Example 4, their differences resided in the steps (2) and (3), specifically:

(2) Preparation of Bulk Gel System with Fluorescent Group

The process comprises the following steps: 1.5 g of the fluorescence modified polyacrylamide composite was initially added into 97.5 g of liquid preparation water (simulated water: comprising 8,000 mg/L NaCl; 1,000 mg/L $CaCl_2$; 1,000 mg/L $MgCl_2$) at room temperature (25° C.), the mixture was stirred for 60 min until the fluorescence modified polyacrylamide composite was dissolved, so as to obtain a fluorescence modified polyacrylamide composite solution; 1.0 g of polyethyleneimine crosslinking agent was added while stirring, subjected to further stirring for 10 min to obtain a gelling solution, and then subjected to standing still at 60° C. for 13 h to obtain the fluorescent gel.

(3) Preparation of the Fluorescent Dispersed Particle Gel

The process comprises the following steps: the aforementioned fluorescent gel having a fluorescent group and the solution preparation water (simulated water: comprising 8,000 mg/L NaCl; 1,000 mg/L $CaCl_2$: 1000 mg/L $MgCl_2$) in a mass ratio of 9:1 were added into a colloid mill at room temperature (25° C.), the mixture was subjected to shearing for 12 min at a constant speed in a rotation speed of 8,000 rpm to prepare the fluorescent dispersed particle gel, the average particle size of the fluorescent dispersed particle gel was measured to be 725 nm.

Example 6

This Example serves to illustrate a fluorescent dispersed particle gel prepared with a process of the present disclosure.

A fluorescent dispersed particle gel was prepared according to the same process as in Example 5, their differences resided in the step (3), specifically:

(3) Preparation of the Fluorescent Dispersed Particle Gel

The process comprises the following steps: the aforementioned fluorescent gel having a fluorescent group and the solution preparation water (simulated water: comprising 8,000 mg/L NaCl; 1,000 mg/L $CaCl_2$; 1000 mg/L $MgCl_2$) in a mass ratio of 10:1 were added into a colloid mill at room temperature (25° C.), the mixture was subjected to shearing for 9 min at a constant speed in a rotation speed of 7,000 rpm to prepare the fluorescent dispersed particle gel, the average particle size of the fluorescent dispersed particle gel was measured to be 810 nm.

Example 7

This Example serves to illustrate a fluorescent dispersed particle gel prepared with a process of the present disclosure.

A fluorescent dispersed particle gel was prepared according to the same process as in Example 1, except for that in the step (1), the acryloyloxyfluorescein was replaced with glycidoxyfluorescein (a monomer represented by Formula (3), wherein $R_2$ is derived from glycidoxy); the remaining steps were the same as those in Example 1, a fluorescent dispersed particle gel was finally prepared.

Example 8

This Example serves to illustrate a fluorescent dispersed particle gel prepared with a process of the present disclosure.

A fluorescent dispersed particle gel was prepared according to the same process as in Example 1, except for that in the step (1), the acryloyloxyfluorescein was replaced with acryloxyfluorescein (a monomer represented by Formula (3), wherein $R_2$ is derived from propyleneoxy), and the remaining steps were the same as those in Example 1, a fluorescent dispersed particle gel was finally prepared.

Comparative Example 1

A fluorescent dispersed particle gel was prepared according to the same process as in Example 1, except for that in the process of preparing fluorescent modified polyacrylamide composite in step (1), acryloyloxyfluorescein was not added, the polyacrylamide was prepared.

Comparative Example 2

A fluorescent dispersed particle gel was prepared according to the same process as in Example 1, except for that the cosolvent sodium dodecylsulfate was not added; the polyacrylamide was prepared.

Comparative Example 3

A fluorescent dispersed particle gel was prepared according to the same process as in Example 1, except for that in the process of preparing the fluorescent gel in step (2), the gelling solution was subjected to standing still at 105° C. for 24 h, such that the polyacrylamide was prepared.

Comparative Example 4

A fluorescent dispersed particle gel was prepared according to the same process as in Example 1, except for that in the process of preparing fluorescent gel in step (2), the crosslinking agent polyethyleneimine was replaced with the crosslinking agent phenolic resin; the polyacrylamide was prepared.

Comparative Example 5

A fluorescent dispersed particle gel was prepared according to the same process as in Example 1, except for that in the step (1), acryloyloxyfluorescein was replaced with N-allyl-4-bromo-1,8 naphthalimide represented by Formula (a), and the remaining steps were the same as in Example 1

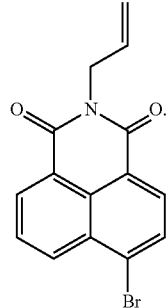

Formula (a)

Comparative Example 6

A fluorescent dispersed particle gel was prepared according to the same process as in Example 1, except for that in step (1), acryloyloxyfluorescein was replaced with 2-allylphenol represented by Formula (b), and the remaining steps were the same as those in Example 1.

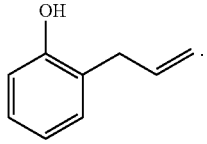

Formula (b)

Comparative Example 7

A fluorescent dispersed particle gel was prepared according to the same method as in Example 1, except for that in step (1), acryloyloxyfluorescein was replaced with allylrhodamine represented by the Formula (c), and the remaining steps were the same as those in Example 1.

Rhodamine B has been identified as a harmful carcinogen that may result in the development of histosarcomas. Other adverse effects include neurotoxicity and reproductive toxicity. It will cause incandescence sensation in eyes, burning sensation in nose and itching nose, chest pain, broil sensation in throat and nausea.

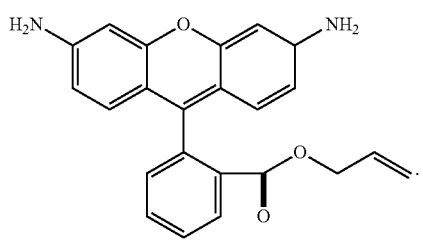

Formula (c)

Application Example 1

The application example aims to illustrate an application of the fluorescent dispersed particle gel of the present disclosure for identifying the dominant seepage channel.

Preparing a dispersion liquid of the fluorescent dispersed particle gel: 0.5 g fluorescent dispersed particle gel prepared in Example 1 was initially added into 100 g liquid preparation water (simulated water: comprising 8,000 mg/L NaCl; 1,000 mg/L $CaCl_2$; 1,000 mg/L $MgCl_2$) at room temperature (25° C.), the mixture was stirred for 10 min until the fluorescent dispersed particle gel was uniformly dispersed, so as to obtain a dispersion liquid of the fluorescent dispersed particle gel having a mass fraction of 0.5%.

Figure 3:
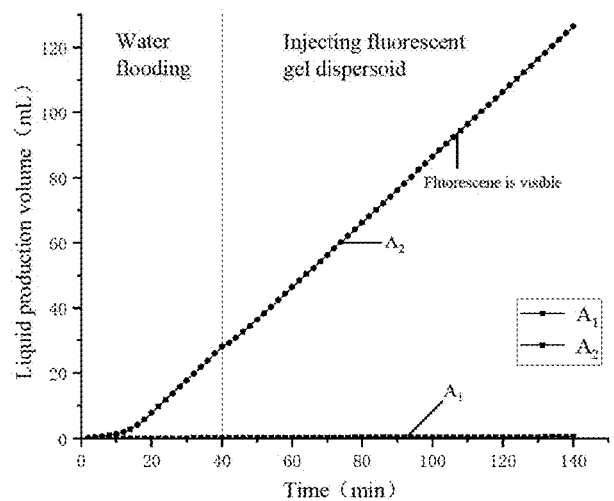
FIG. 3 shows the time relationship of visible fluorescent tracer agent in the detection of fluorescent dispersed particle gel in a double-tube parallel rock core physical experiment according to the Application Example 1 of the present disclosure.

A double-tube rock core parallel physical model was adopted to simulate the heterogeneity of a reservoir, wherein the specification of said rock core was 20 cm in length and 2.5 cm in diameter, the permeability of the No. $A_1$ rock core was 258 mD, and the permeability of the No. $A_2$ rock core was 911 mD. The simulated water (the mineralization degree: 8,000 mg/L NaCl; 1,000 mg/L $CaCl_2$; 1,000 mg/L $MgCl_2$) with a water flooding flow speed of 1 mL/min was adopted to drive the double-tube rock core parallel physical model until the pressure was stable; subsequently the dispersion liquid of the fluorescent dispersed particle gel prepared in Example 1 having a mass fraction of 0.5% was injected at a flow rate of 1 mL/min, the produced liquid was subjected to the fluorescence analysis for each interval of 2 min, and the time when the fluorescent rock core was first seen was recorded (see FIG. 3); FIG. 3 shows the time relationship of visible fluorescent tracer agent in the detection of fluorescent dispersed particle gel in a double-tube parallel rock core physical experiment: as illustrated in FIG. 3, when the fluorescent dispersed particle gel was injected for 65 min, the fluorescent dispersed particle gel was first detected from the No. $A_2$ rock core, it indicated the dominant seepage channel development in the No. $A_2$ rock core in the double-tube rock core parallel physical model. Moreover, in the present disclosure, the term "time of visible fluorescent tracer agent" refers to the time of detecting fluorescence at the outlet of the rock core after the fluorescent tracer agent was injected in the rock core physical experiment, the earlier was the time that the fluorescence was detected, the more developed was the dominant channel of the rock core.

Figure 4:
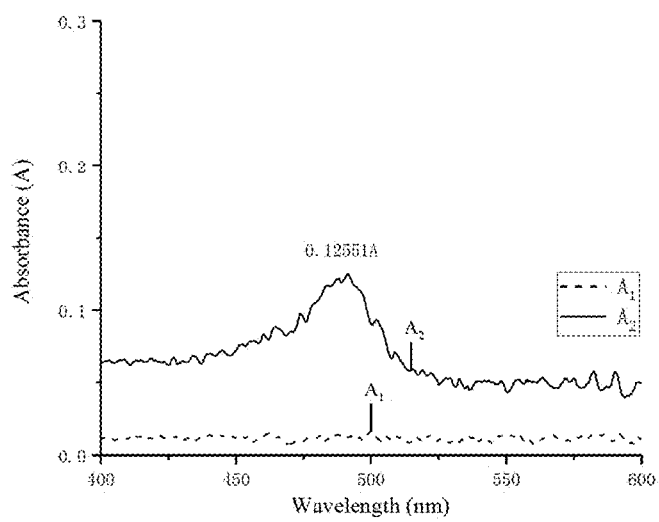
FIG. 4 illustrates an absorption spectrum of a fluorescent dispersed particle gel in a double-tube parallel rock core physical experiment according to the Application Example 1 of the present disclosure.

The fluorescent dispersed particle gel was then continuously injected until the fluorescence intensity of the produced liquid was no longer changed, the produced liquid was subjected to an absorption spectroscopy analysis (see FIG. 4). As can be seen from FIG. 4 that in the produced liquid absorbance analysis, the absorbance of the dispersed particle gel in the produced liquid of No. A, rock core was 0.01379 A, the absorbance of the dispersed particle gel in the produced liquid of No. $A_2$ rock core was 0.12551 A, it indicated that the low-concentration fluorescent dispersed particle gel (50 mg/L) in the produced liquid can still be detected when the concentration is low.

Application Example 2

The application example aims to illustrate an application of the fluorescent dispersed particle gel of the present disclosure for identifying the dominant seepage channel.

Preparing a dispersion liquid of the fluorescent dispersed particle gel: 2.5 g fluorescent dispersed particle gel prepared in Example 1 was initially added into 100 g liquid preparation water (simulated water: comprising 8,000 mg/L NaCl; 1,000 mg/L $CaCl_2$; 1,000 mg/L $MgCl_2$) at room temperature (25° C.), the mixture was stirred for 10 min until the fluorescent dispersed particle gel was uniformly dispersed, so as to obtain a dispersion liquid of the fluorescent dispersed particle gel having a mass fraction of 2.5%.

Figure 5:
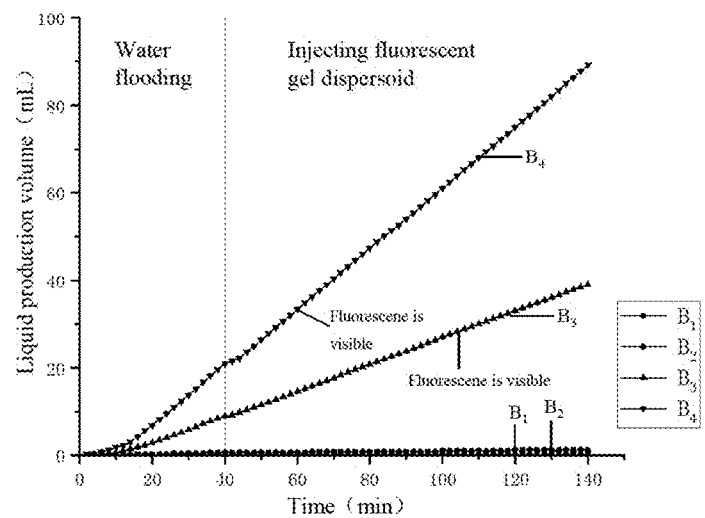
FIG. 5 shows the time relationship of visible fluorescent tracer agent in the detection of fluorescent dispersed particle gel in a four-tube parallel rock core physical experiment according to the Application Example 2 of the present disclosure.

A four-tube rock core parallel physical model was adopted to simulate the heterogeneity of a reservoir, wherein the specification of said rock core was 20 cm in length and 2.5 cm in diameter, the permeability of the No. $B_1$ rock core was 175 mD, the permeability of the No. $B_2$ rock core was 796 mD, the permeability of the No. $B_3$ rock core was 2,178 mD, the permeability of the No. $B_4$ rock core was 2,972 mD. The simulated water (the mineralization degree: 8,000 mg/L NaCl; 1,000 mg/L $CaCl_2$; 1,000 mg/L $MgCl_2$) with a water flooding flow speed of 1 mL/min was adopted to drive the four-tube rock core parallel physical model until the pressure was stable; subsequently the dispersion liquid of the fluorescent dispersed particle gel prepared in Example 1 having a mass fraction of 2.5% was injected at a flow rate of 1 mL/min, the produced liquid was subjected to the fluorescence analysis for each interval of 2 min, and the time when the fluorescent rock core was first seen was recorded (see FIG. 5); FIG. 5 shows the time relationship of visible fluorescent tracer agent in the detection of fluorescent dispersed particle gel in a four-tube parallel rock core physical experiment; as illustrated in FIG. 5, when the fluorescent dispersed particle gel was injected for 20 min, the fluorescent dispersed particle gel was first detected from the No. $B_4$ rock core; when the fluorescent dispersed particle gel was injected for 64 min, the fluorescent dispersed particle gel was detected from the No. $B_3$ rock core, it indicated the dominant seepage channel development in the No. $B_4$ rock core in the four-tube rock core parallel physical model, it was followed by the dominant seepage channel development in the No. $B_3$ rock core.

Figure 6:
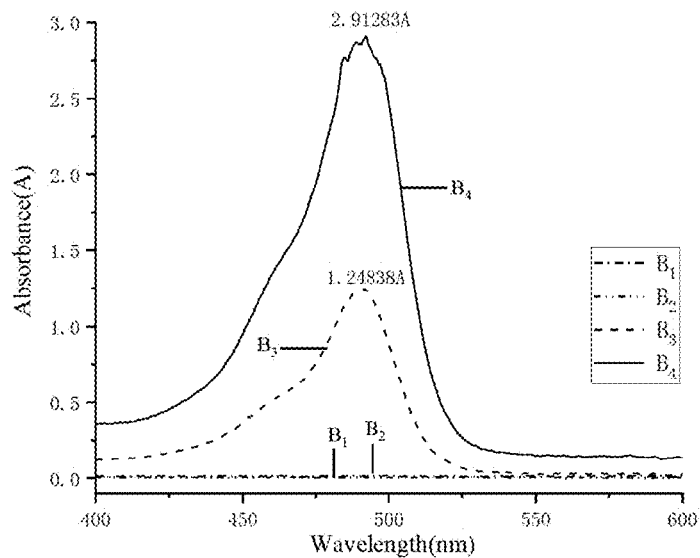
FIG. 6 illustrates an absorption spectrum of a fluorescent dispersed particle gel in a four-tube parallel rock core physical experiment according to the Application Example 2 of the present disclosure.

The fluorescent dispersed particle gel was then continuously injected until the fluorescence intensity of the produced liquid was no longer changed, the produced liquid was subjected to an absorption spectroscopy analysis (see FIG. 6). As can be seen from FIG. 6 that in the produced liquid absorbance analysis, the absorbance of the dispersed particle gel in the produced liquid of No. $B_4$ rock core was 2.91283 A, the absorbance of the dispersed particle gel in the produced liquid of No. $B_3$ rock core was 0.12551 A, the absorbance of the dispersed particle gel in the produced liquid of No. $B_2$ rock core was 0.00604 A, the absorbance of the dispersed particle gel in the produced liquid of No. $B_1$ rock core was 0.00203 A, it demonstrated that the low-concentration fluorescent dispersed particle gel (50 mg/L) in the produced liquid can still be detected when the concentration is low.

Application Example 3

The fluorescent dispersed particle gels prepared in Examples 2-8 and Comparative Examples 1-5 were applied in the identification of the dominant seepage channels according to the method of the Application Example 1, the results were shown in Table 1.

TABLE 1

| | Time of visible fluorescent tracer agent first detected | $A_2$ absorbance | $A_1$ absorbance |
|---|---|---|---|
| Example 2 | 66 min | 0.12551A | 0.01379A |
| Example 3 | 68 min | 0.10814A | 0.00928A |
| Example 4 | 70 min | 0.09535A | 0.01284A |
| Example 5 | 71 min | 0.10218A | 0.00696A |
| Example 6 | 71 min | 0.09179A | 0.00843A |
| Example 7 | 68 min | 0.08402A | 0.00817A |
| Example 8 | 67 min | 0.09211A | 0.00646A |
| Comparative Example 1 | Fluorescence is not shown | 0.00165A | 0.00221A |
| Comparative Example 2 | 94 min | 0.02533A | 0.00589A |
| Comparative Example 3 | Fluorescence is not shown | 0.00512A | 0.00458A |
| Comparative Example 4 | — | — | — |
| Comparative Example 5 | 89 min | 0.02431A | 0.00325A |

Remark: the term "time of visible fluorescent tracer agent first detected" in Table 1 refers to the time when the fluorescent dispersed particle gel in the No. $A_2$ rock core was first detected; "-" refers to that the fluorescent dispersed particle gel is not detected.

Application Example 4

The fluorescent dispersed particle gels pre-pared in Examples 2-8 and Comparative Examples 1-5 were applied in the identification of the dominant seepage channels according to the method of the Application Example 2, the results were shown in Table 2.

TABLE 2

| Absorbance analysis of the produced liquid | | | | | |
|---|---|---|---|---|---|
| | Time of visible fluorescent tracer agent first detected | $B_4$ absorbance | $B_3$ absorbance | $B_2$ absorbance | $B_1$ absorbance |
| Example 2 | 22 min | 3.04169A | 0.12551A | 0.00509A | 0.00286A |
| Example 3 | 25 min | 2.75331A | 0.11853A | 0.00371A | 0.00220A |
| Example 4 | 26 min | 2.53225A | 0.08939A | 0.00479A | 0.00354A |
| Example 5 | 30 min | 2.58433A | 0.09284A | 0.00408A | 0.00398A |
| Example 6 | 28 min | 2.42170A | 0.08650A | 0.00446A | 0.00542A |
| Example 7 | 25 min | 2.64314A | 0.07516A | 0.00413A | 0.00351A |
| Example 8 | 75 min | 2.53525A | 0.08484A | 0.00457A | 0.00372A |
| Comparative Example 1 | Fluorescence is not shown | 0.00343A | 0.00587A | 0.00391A | 0.00552A |
| Comparative Example 2 | 58 min | 0.13291A | 0.01411A | 0.00574A | 0.00303A |
| Comparative Example 3 | Fluorescence is not shown | 0.00483A | 0.00241A | 0.00582A | 0.00486A |
| Comparative Example 4 | — | — | — | — | — |
| Comparative Example 5 | 48 min | 0.15853A | 0.01385A | 0.00397A | 0.00568A |

Remark: the term "time of visible fluorescent tracer agent first detected" in Table 2 refers to the time when the fluorescent dispersed particle gel in the No. $B_4$ rock core was first detected; "-" refers to that the fluorescent dispersed particle gel is not detected.

The combined results of Table 1 and Table 2 demonstrate that as can be seen from the Comparative Examples 1-3 and Examples 4-6, the absorbance of the fluorescent dispersed particle gel is basically unchanged under the condition of stable outflow, the fluorescent property of the fluorescent dispersed particle gel is not strongly correlated with the particle size of the dispersoid, it is only associated with the content of the fluorescent group, namely the content of the fluorescent group of the prepared fluorescence modified polyacrylamide composite.

As can be seen from the Comparative Examples 1, 7 and 8, when compared with glycidoxy fluorescein and propenyloxy fluorescein, the fluorescent dispersed particle gel prepared from the propenyloxy fluorescein has the advantages of short detection time of visible fluorescent tracer agent, large absorbance and better fluorescence property.

It is illustrated from the comparison between Example 1 and Comparative Example 1, the polyacrylamide without the fluorescent group has extremely low absorbance, and the fluorescent property of the fluorescent dispersed particle gel is mainly provided by the fluorescent group.

It can be seen from comparison between Example 1 and Comparative Example 2 that the fluorescent dispersed particle gel prepared without adding the cosolvent has prolonged time of visible fluorescent tracer agent, and weakened fluorescence intensity; the solubility of the acryloxyl fluorescein in the system is obviously reduced due to the lack of the cosolvent, and the fluorescence property of the prepared fluorescent dispersed particle gel is obviously degraded.

The comparison results between Example 1 and Comparative Example 3 indicate that the absorbance of the prepared fluorescent dispersed particle gel is extremely low when the temperature in which the gelling liquid is placed rises from 60° C. to 105° C., the high temperature destroys the fluorescent group structure, so that the fluorescent gel basically loses the fluorescent property, and the prepared fluorescent dispersed particle gel cannot be used for identifying the dominant channel.

In addition, the fluorescent dispersed particle gel in Comparative Example 4 was prepared from a phenolic resin gel gelled at a high temperature, and the high temperature destroyed the fluorescent group structure, and the test cannot be performed.

The fluorescence group in the Comparative Example 5 is replaced by N-allyl-4-bromo-1,8 naphthalimide from acryloyloxyfluorescein, the fluorescence property is degraded along with the temperature rise; in the process of preparing the gel in step (2), the gelling temperature 60° C. obviously degrades the fluorescence property, and the prepared fluorescent dispersed particle gel cannot be used for identifying the dominant channel.

Application Example 5

The spectrogram of the fluorescence excitation spectrum (Ex) and emission spectrum (Em) of the fluorescent dispersed particle gel prepared in Comparative Example 6 were measured according to the process of Example 2; both the fluorescence excitation wavelength and the fluorescence emission wavelength of the fluorescent dispersed particle gel are obviously shortened to be 272 nm and 298 nm respectively, the fluorescence emission wavelength will coincide with the emission wavelength of partial aromatic hydrocarbons in crude oil, the crude oil contained in a produced liquid may significantly interfere with the experimental result, thus the fluorescent dispersoid prepared in Comparative Example 6 cannot be used for identifying the dominant channel.

The above content describes in detail the preferred embodiments of the present disclosure, but the present disclosure is not limited thereto. A variety of simple modifications can be made to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A fluorescence modified polyacrylamide composite, wherein the composite comprising a structural unit represented by Formula (1) and a structural unit represented by Formula (2); and the composite is a block copolymer,

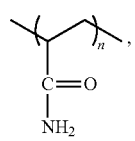

Formula (1)

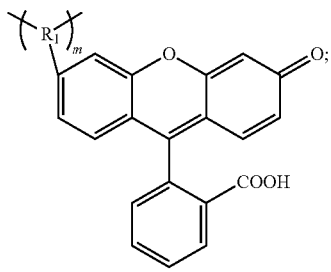

Formula (2)

wherein m is an integer within a range of 6-60, n is an integer within a range of 2,800-28,000;

$R_1$ is derived from

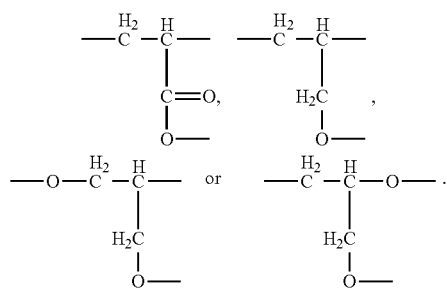

2. The composite of claim 1, wherein m is an integer within a range of 16-30, n is an integer within a range of 7,000-14,000;

wherein $R_1$ is derived from

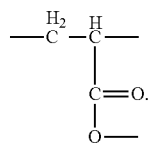

3. The composite of claim 1, wherein the fluorescence modified polyacrylamide composite has a weight average molecular weight within a range of $20\times10^4$ to $200\times10^4$.

4. A fluorescent gel, wherein the fluorescent gel has a structure represented by Formula (4);

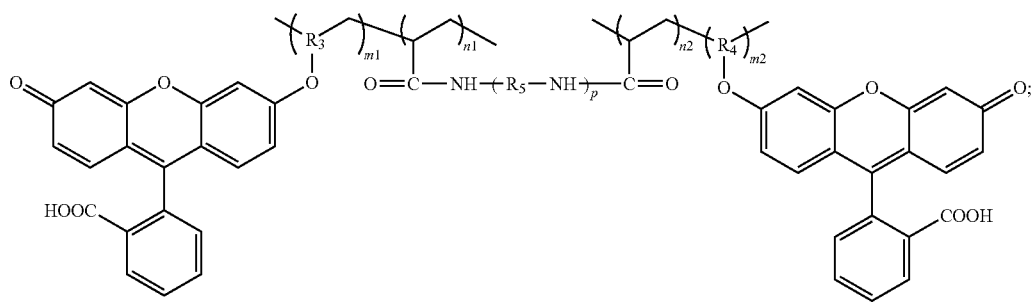

Formula (4)

wherein $m_1$ and $m_2$ are the same or different, and each is an integer within a range of 6-60; $n_1$ and $n_2$ are the same or different, and each is an integer within a range of 2,800-28,000; p is an integer within a range of 1,200-1,600;

wherein $R_3$ and $R_4$ are the same or different, each is derived from

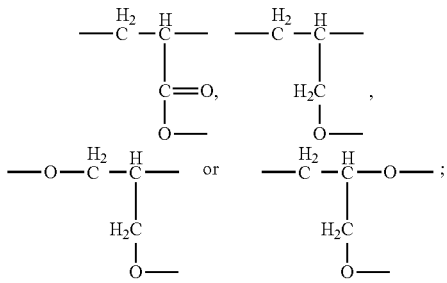

wherein $R_5$ is derived from ethylidene or propylidene;

wherein the preparation method of the fluorescent gel comprises:
- (1) dissolving the fluorescence modified polyacrylamide composite of claim 1 in solution preparation water to obtain a composite solution;
- (2) mixing the composite solution with an imine cross-linking agent to obtain a gelling solution;
- (3) aging the gelling solution to obtain the fluorescent gel.

5. The fluorescent gel of claim 4, wherein $m_1$ and $m_2$ are the same, and each is an integer within a range of 16-30; $n_1$ and $n_2$ are the same, and each is an integer within a range of 7,000-14,000; p is an integer within a range of 1,400-1,500;

wherein $R_3$ and $R_4$ are derived from

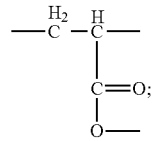

wherein $R_5$ is derived from ethylidene.

6. A fluorescent dispersed particle gel, wherein the fluorescent dispersed particle gel is obtained by shearing a fluorescent gel and water; wherein the fluorescent gel is the fluorescent gel of claim 4.

7. The fluorescent dispersed particle gel of claim 6, wherein the weight ratio of the fluorescent gel to the water is (2-20): 1.

8. The fluorescent dispersed particle gel of claim 6, wherein the fluorescent dispersed particle gel has a particle size of 200-600 nm.

* * * * *